(12) United States Patent
Claessen

(10) Patent No.: US 7,904,032 B2
(45) Date of Patent: Mar. 8, 2011

(54) METHODS AND APPARATUS FOR SINGLE SIDEBAND MODULATION EMPLOYING A FREQUENCY SHIFT

(75) Inventor: Albert M. G. Claessen, Oakwood, GA (US)

(73) Assignee: NCR Corporation, Duluth, GA (US)

( * ) Notice: Subject to any disclaimer, the term of this patent is extended or adjusted under 35 U.S.C. 154(b) by 992 days.

(21) Appl. No.: 11/613,293

(22) Filed: Dec. 20, 2006

(65) Prior Publication Data

US 2008/0150687 A1  Jun. 26, 2008

(51) Int. Cl.
 *H04B 1/40* (2006.01)
(52) U.S. Cl. .............................. 455/83; 455/84; 340/10.1
(58) Field of Classification Search .................. 340/10.1; 455/83, 84
See application file for complete search history.

(56) References Cited

U.S. PATENT DOCUMENTS

| | | | | |
|---|---|---|---|---|
| 5,751,820 A | * | 5/1998 | Taenzer | 381/312 |
| 5,940,006 A | * | 8/1999 | MacLellan et al. | 340/10.1 |
| 6,084,530 A | * | 7/2000 | Pidwerbetsky et al. | 340/10.1 |
| 7,035,322 B2 | * | 4/2006 | Girard | 375/219 |
| 2007/0188305 A1 | * | 8/2007 | Drucker | 340/10.4 |

* cited by examiner

*Primary Examiner* — Yuwen Pan
(74) *Attorney, Agent, or Firm* — Peter Priest; Paul W. Martin

(57) ABSTRACT

Systems and techniques for RFID communication using a frequency shift between uplink and downlink carrier frequencies achieved by digital processing of a baseband signal before radio frequency modulation of a carrier signal occurs. Generation of the carrier signal, and modulation of the carrier signal, is accomplished using digital techniques. A digital representation of a baseband signal is modulated to create a complex baseband signal multiplied by a negative frequency shift equal to a difference between downlink and uplink carrier frequencies. This signal undergoes analog to digital conversion and modulation by a carrier signal at an uplink frequency. The complex baseband signal includes in-phase and quadrature components. During uplink communication, the in-phase component of the complex baseband signal is replaced by a constant value. The quadrature component is replaced by a zero signal. During uplink communication, therefore, an umodulated carrier signal at an uplink frequency is generated.

10 Claims, 4 Drawing Sheets

METHODS AND APPARATUS FOR SINGLE SIDEBAND MODULATION EMPLOYING A FREQUENCY SHIFT

FIELD OF THE INVENTION

The present invention relates generally to improvements to radio frequency identification (RFID) communications. More particularly, the invention relates to improved systems and techniques for generating a carrier signal that is modulated using a digital implementation of single sideband amplitude shift keying for downlink communication, with the digital implementation allowing for rapid switching between downlink and uplink frequencies performed before modulation of an actual physical carrier signal.

BACKGROUND OF THE INVENTION

An RFID system typically operates by transmission of a carrier signal by an RFID reader. The carrier signal is modulated by an RFID tag, and the modulated signal is received at and interpreted by the reader. RFID systems may employ one of a number of different modulation techniques for communication. In communications with a passive RFID tag, an RFID reader transmits a carrier signal for uplink and downlink communication. In downlink communication, the reader is transmitting data to the tag, and modulates the carrier signal in order to communicate the data. In uplink communication, an RFID tag modulates the carrier signal transmitted by the reader, and the signal is returned to the reader in the form of modulated backscatter. During uplink communication, the carrier signal transmitted by the reader is unmodulated. The carrier signal powers the tag and is modulated by the tag in order to furnish communication by the tag to the reader.

The particular modulation technique used depends on a number of factors, such as the preferences of an organization and the radio frequency spectrum allocated to such use. The available spectrum, and the allocation of portions of the available spectrum to uplink and downlink communications depends on a number of factors, such as government regulations or industry standards. In many applications, a relatively narrow frequency spectrum is available. This condition is particularly prevalent in European applications, where a relatively narrow frequency range is reserved for RFID reader communications. In addition, installations employing multiple readers typically manage frequency allocations in such a way that the downlink communication of one reader does not overlap in frequency with the uplink communication of another reader. In such applications, single sideband amplitude shift keying is frequently used, because the frequency spectrum used by downlink communications, that is, modulated signals transmitted from the reader to an RFID tag, can be relatively narrow. In SSB-ASK communications, an RFID reader uses separate carrier frequencies for the carrier signal between downlink and uplink communications. Therefore, the reader must change carrier frequencies every time a switch is made between uplink and downlink communication.

Prior art systems typically achieve the needed frequency changes in hardware. A fast frequency conversion requires a fast changing local oscillator. The use of a fast changing oscillator may lead to unstable operation and spurious out of band emissions. However, the use of a slow changing oscillator negatively affects performance, because the frequency change is relatively slow and communication cannot occur during a frequency change, but instead must wait until a carrier signal has stabilized at the new frequency.

SUMMARY OF THE INVENTION

The present invention addresses such problems, as well as others, by performing modulation in such a way that implementation of the carrier shift between uplink and downlink carrier signals is performed by digital processing of a data signal before the actual radio frequency modulation of the carrier signal takes place. The generation of the carrier signal, and the modulation of the carrier signal, when needed, may suitably be accomplished using digital signal processing techniques. A digital representation of a baseband signal is modulated onto a carrier signal having a negative frequency equal to a frequency shift between downlink and uplink carrier frequencies of the carrier signal transmitted by an RFID reader. This modulation creates a complex baseband signal having in-phase and quadrature components. This complex baseband signal then undergoes analog to digital conversion, and modulation. The in-phase and quadrature components are suitably converted to analog form and passed to an in-phase/quadrature modulator, which modulates the in-phase component with the carrier signal at the uplink frequency, and modulates the quadrature component with a 90 degree phase shift of the carrier signal at the uplink frequency. During uplink communication, a constant signal is imposed on the in-phase component, A zero signal, or no signal, is substituted for the quadrature component. During the uplink communication, therefore, the in-phase/quadrature modulator produces the carrier signal at an umodulated uplink frequency.

A more complete understanding of the present invention, as well as further features and advantages of the invention, will be apparent from the following Detailed Description and the accompanying drawings.

DETAILED DESCRIPTION

Figure 1:
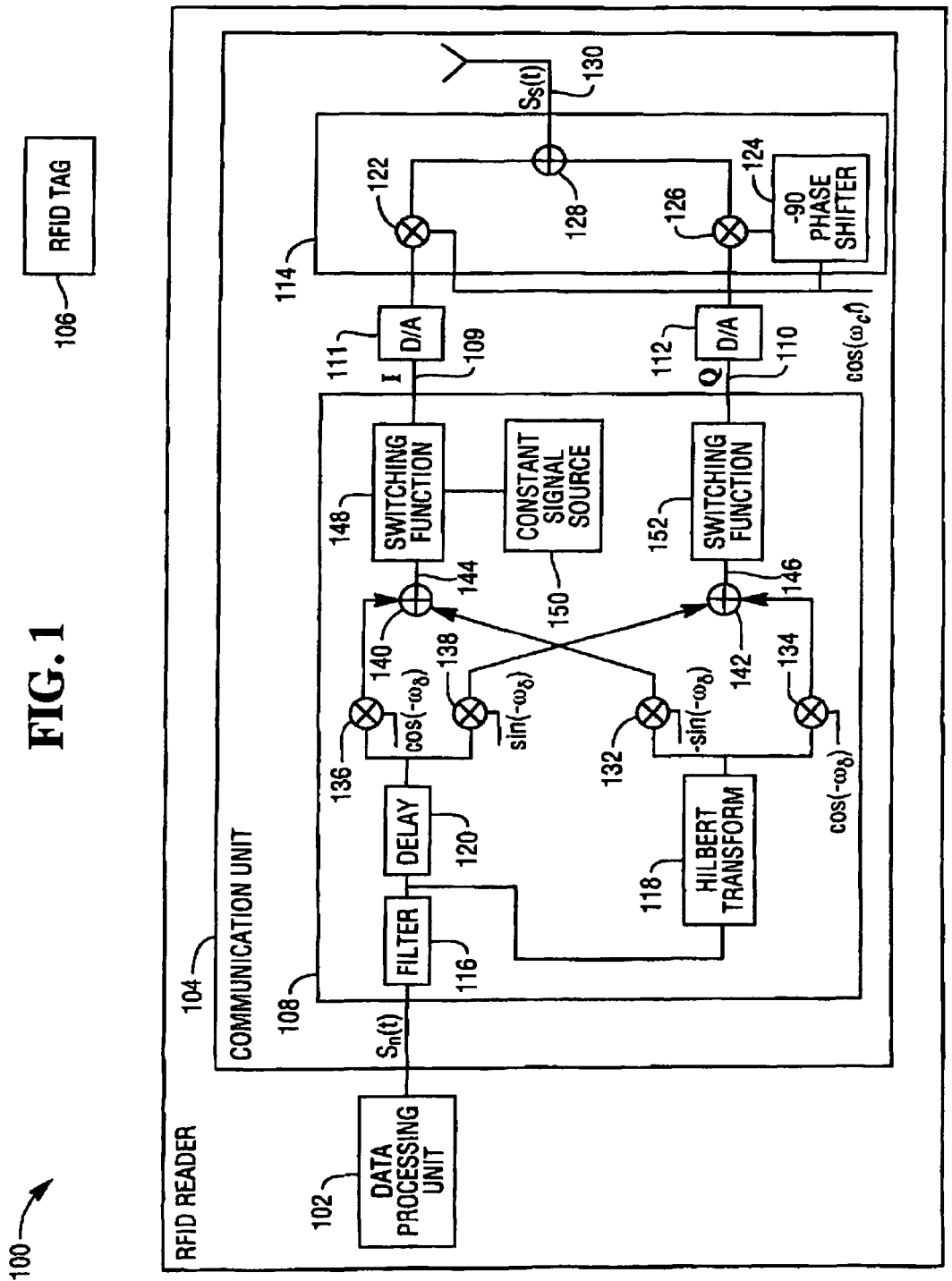
FIG. 1 illustrates an RFID reader according to an aspect of the present invention.

FIG. 1 illustrates an RFID reader 100 according to an aspect of the present invention. The reader 100 comprises a data processing unit 102 and a communication unit 104, and may also include an external interface in order to receive data to be communicated to RFID tags and to relay data received from RFID tags. The communication unit 104 communicates with RFID tags using a carrier signal modulated using single sideband amplitude shift keying (SSB-ASK) for downlink communication, and unmodulated during uplink communication. In order to transmit data to a tag, such as the tag 106, the communication unit 104 receives data from the data processing unit 102, and uses the data to modulate a carrier signal used to communicate data to the tag 106 during a down link communication. During the downlink communication, the carrier signal is transmitted at a chosen frequency, conveniently referred to as the downlink frequency.

The communication unit 104 alternates between downlink transmissions to the tag 106 and uplink communications with the tag 106, during which the communication unit 104 receives data from the tag 106. During uplink, the carrier signal transmitted by the communication unit 104 to the tag 106 is unmodulated, and is at a frequency different from that of the carrier signal during downlink communication. The downlink frequency differs from the uplink frequency by a suitably negative frequency shift.

During uplink communication, the carrier signal powers the tag 106 and is modulated by the tag 106 to communicate information to the communication unit 104 through modulated backscatter. In order to perform both uplink and downlink communications, the communication unit 104 must switch rapidly between the uplink frequency and the downlink frequency, with the carrier signal taking on the uplink frequency as soon as possible after the tag 106 has received the downlink transmission, and switching to the downlink frequency as soon as possible after the uplink communication has been received. In order to achieve a rapid switch between the uplink and down-link frequencies, the communication unit 104 employs digital signal processing techniques to create a signal, and implements the carrier frequency shift before radio frequency modulation of the carrier signal takes place.

In order to perform SSB-ASK modulation, the communication unit 104 employs a digital signal processor (DSP) 108 to process a digital data signal produced by the data processing unit 102 and create a digital representation of a carrier signal. This digital representation is converted to analog form and further modulated in order to generate the signal transmitted by the communication unit 104. The digital signal processor separates a data signal produced by the data processing unit 102 into an in-phase, or I, component, and a quadrature, or Q, component, produced as I and Q outputs 109 and 110 of the digital signal processor 108. The I and Q outputs 109 and 110 are provided to digital to analog converters (D/A converters) 111 and 112, respectively, to convert the digital signals to analog signals. The analog signals produced by the D/A converters 111 and 112 are then provided to an I/Q modulator 114. The I/Q modulator 114 generates a radio frequency signal that is transmitted to the tag 106.

During downlink communication, the carrier signal is modulated using single sideband amplitude shift keying modulation. This can be achieved by generating a double sideband modulated signal with suppressed carrier, and a double sideband suppressed carrier signal that is based on a 90 degrees phase shifted carrier signal, Steps for achieving this result can be described by the following definitions and operations:

$S_n(t)$ is a non-return to zero encoded base-band (data) signal consisting of a sequence of logical "1" and "0" data symbols represented by a positive number being a logical "1" and an equal magnitude negative number a logical "0". As illustrated here, $S_n(t)$ is the output of the data processing unit 102.

$\hat{S}_n(t)$ is a 90 degrees phase shifted (Hilbert transform) copy of $S_n(t)$, where $\cos(\omega t)$ is the modulating carrier signal, $\sin(\omega t)$ is the −90 degrees shifter carrier signal.

$\cos(\omega t)$ is the modulating carrier signal.

$\sin(\omega t)$ is a negative 90, or −90 degree shift of the carrier signal.

$S_s(t)$ is the transmitted single sideband radio frequency signal transmitted by the communication unit 104. That is, $S_s(t)$ is the output of the I/Q modulator 114.

In the complex domain, $S_s(t)$ can be represented as follows: $S_s(t)=Re\{S_c(t) \times e^{j\omega t}\}$, where $S_c(t)=S_n(t)+j\hat{S}_n(t)$ and $e^{j\omega t}$ is the complex carrier wave. In the example given, the physical output signal transmitted by the communication unit 104 is the real part of the complex multiplication and is implemented in hardware by the I/Q modulator 114.

The DSP 108 receives the data signal $S_n(t)$ from the data processing unit 102 and performs processing on the signal. The DSP 108 is illustrated here as including various processing elements for ease of illustration, but it will be recognized that the elements shown here represent functions implemented in the DSP 108 by suitable programming.

Specifically, the DSP 108 first implements a filtering operation 116 in order to limit the signal spectrum that will be generated in accordance with applicable regulations and standards. The filtered signal is then split and subjected to a Hilbert transform 118 to generate the imaginary part of the complex expression above. The signal is also subjected to a delay operation 120, so that the real part of the signal will match the timing of the imaginary part, which is subjected to a delay generated by the Hilbert transform 118.

The real and imaginary parts of the signal are then passed as the outputs 109 and 110 of the DSP to the D/A converters 111 and 112. The outputs of the D/A converters 111 and 112 are supplied as inputs to the I/Q modulator 114. The I/Q modulator 114 also receives the carrier signal $\cos(\omega_c t)$ as an input. The carrier signal is passed to a multiplier 122, and multiplied by the real output of the DSP 108. The carrier signal is also passed to a phase shifter 124 and subjected to a 90 degree phase shift, and this 90 degree phase shifted carrier signal is passed to a multiplier 126 and multiplied by the imaginary output of the DSP 108. The outputs of the multipliers 122 and 126 are then supplied to a summation unit 128 to generate the transmitted signal $S_s(t)$ as an output of the I/Q modulator 114. The transmitted signal $S_s(t)$ is transmitted to the tag 106 through an antenna 130.

If the outputs of the Hilbert transform 118 and the delay operation 120 are supplied to the I/Q modulator 114 without further processing, a single sideband modulated signal is produced, requiring a local oscillator and additional hardware to switch between the modulated signal produced by the I/Q modulator 114 during downlink communication, and an unmodulated signal generated by the reader 100 during uplink communication. This unmodulated signal is transmitted by the reader 100 during uplink communication in order to power RFID tags, such as the tag 106, within range. The unmodulated signal is modulated by the RFID tags and returned to the reader in order to furnish communication between the tags and the reader 100.

However, in order to avoid the local oscillator and additional hardware, the outputs of the Hilbert transform 118 and the delay operation 120 are subjected to additional processing by the DSP 108 as discussed below.

The DSP 108 modulates the baseband signal $S_n(t)$ with a negative carrier frequency equal to the frequency shift desired between the downlink transmission and the uplink transmission. If the desired carrier frequency is represented as $\omega$, the unmodulated carrier frequency for the uplink may be represented as $\omega_C$ and the frequency shift may be represented as $\omega_\delta$. This relationship may be represented as:

$\omega = \omega_C - \omega_\delta$.

$S_c(t)$ is a complex representation, allowing the use of negative frequency shifts. $S_c(t) = S_n(t) + j\text{Hilbert}(S_n(t))$, where $S_n(t)$ is the output of the data processing unit 102 and $j\text{Hilbert}(S_n(t))$ is the complex Hilbert transformation of $S_n(t)$. The single sideband signal $S_s(t)$, discussed above, can be represented as follows:

$S_s(t)=Re\{S_c(t) \times e^{j\omega t}\}$. Substituting the relationship $\omega=\omega_C-\omega_\delta$ yields $S_s(t)=Re\{S_c(t) \times e^{j\omega_C t} \times e^{-j\omega_\delta t}\}$, which is equivalent to $S_s(t)=Re\{S_c(t) \times e^{j\omega_\delta t} \times e^{j\omega_\delta t}\}$.

The single sideband carrier frequency shift can be implemented by first modulating the complex baseband signal in the DSP 108 with a negative carrier frequency shift, and then converting the complex baseband signal, thus modulated, to a physical signal for transmission by further modulating the complex baseband signal using an in-phase/quadrature modulator in order to modulate the complex baseband signal onto the unmodulated uplink signal. In-phase and quadrature components of the complex baseband signal modulated with a negative carrier frequency are supplied to the I/Q modulator 114.

As noted above, the DSP 108 first implements a filter operation 116 on the signal $S_c(t)$ in order to limit the signal spectrum that will be generated in accordance with applicable regulations and standards. The filtered signal is then split and subjected to a Hilbert transform 118 to generate the imaginary part of $S_c(t)$ The signal is also subjected to a delay operation 120, which produces as an output the real part of $S_c(t)$. The delay operation 120 insures that the real part of the $S_c(t)$ will match the timing of the imaginary part, which is subjected to a delay generated by the Hilbert transform 118.

The next operation is a complex multiplication of the complex signal $S_c(t)$ with a complex negative frequency signal $e^{-j\omega_\delta t}$. This complex multiplication is equivalent to $\cos(-\omega_\delta t)+\sin(-\omega_\delta t)$. The complex multiplication is achieved by four multiplications, performed by multipliers 132, 134, 136, and 138. The sum of the outputs of the multipliers 136 and 138 generates the real part of the complex multiplication, while the sum of the outputs of the multipliers 132 and 134 generates the complex part of the multiplication.

This implementation is illustrated in FIG. 1 by first splitting the signals coming from the Hilbert transform 118 and the delay operation 120. The signal from the Hilbert transform 118 is passed to the multipliers 132 and 134, and multiplied by $-\sin(-\omega_\delta)$ and $\cos(-\omega_\delta)$, respectively. The multiplication by $-\sin(-\omega_\delta)$ modulates the output of the Hilbert transform 118 onto a −90 degree phase shift for the frequency shifted carrier, taking the negative of the carrier. The multiplication by $\cos(\omega_\delta)$ modulates the output of the Hilbert transform 118 onto the frequency shifted carrier.

The signal from the delay operation 120 is passed to the multipliers 136 and 138, and thus multiplied by $\cos(\omega_\delta)$ and $\sin(-\omega_\delta)$, respectively. The signal from the delay operation 120 is thus modulated onto the in-phase and −90 degree phase shifted carrier signal for the frequency shift.

The outputs of the multiplier 136 and of the multiplier 132 are passed to a summation unit 140, thus subtracting the imaginary −90 degree phase shifted carrier signal for the frequency shift from the real in-phase carrier signal for the frequency shift. The outputs of the multiplier 138 and 136 are passed to a summation unit 142, thus adding the real −90 degree phase shifted carrier signal for the frequency shift and the in-phase imaginary carrier signal for the frequency shift. The output of the summation unit 140 and the summation unit 142 produce summation unit outputs 144 and 146.

In order to generate the modulated signal, the outputs of the summation units 144 and 146 are used as the outputs 109 and 110 of the DSP 108. These signals are converted to real time signals using the D/A converters 111 and 112. Next, complex multiplication with the carrier signal is performed in order to generate the signal $S_s(t)$. This is achieved using the quadrature modulator 114. Because only the real signal needs to be generated, only two multiplications need to be preformed. The imaginary portion of the signal $S_c(t)$ can be ignored. At this point, no negative frequency information is presented because this was eliminated by multiplying the carrier signal. The output of this operation is the transmit signal $S_s(t)$ at the output 128.

In order to provide for a fast shift between the modulated carrier frequency $\omega$ and the unmodulated carrier frequency $\omega_C$ for a transition from the downlink communication phase of operation to the uplink communication phase, the DSP 108 implements additional elements that may substitute their own outputs for the outputs 144 and 146 of the summation units 140 and 142. A switching function 148 connects the output 144 of the summation unit 140, and a constant signal source 150, to the output 109. The DSP 108 also implements a switching function 152 between output 146 of the summation unit 136 and the output 110.

The outputs 109 and 110 of the DSP 108 are supplied to the D/A converters 111 and 112, respectively, which convert them to real time signals. During the downlink communication phase, the switching functions 148 and 152 direct the outputs 144 and 146 of the summation unit 140 and the summation unit 142 to the outputs 109 and 110 of the DSP 108 during the downlink communication phase. The D/A converters 111 and 112 convert signals appearing at the outputs 109 and 110 to digital form and pass them to the I/Q modulator 114, where they are modulated with the unmodulated uplink signal, and the negative 90 degrees phase shifted uplink signal, to for the modulated downlink signal at the downlink frequency.

During the uplink communication phase, the switching function 148 passes the output 144 of the constant signal source 150 to the output 109. The switching function 152 blocks the output 146 of the summation unit 136, so that no signal, or a 0 signal, appears at the output 110. During the uplink communication phase, therefore, a constant signal source is supplied to the I/Q modulator 114 and modulated onto a carrier wave at the unmodulated carrier frequency. The switching functions 148 and 152 are implemented as software operations, as are the other operations of the DSP 108, so that the shift between the modulated carrier frequency produced by the downlink operation of the DSP 108 and the uplink operation of the DSP 108 occurs at a very high speed.

Figure 2:
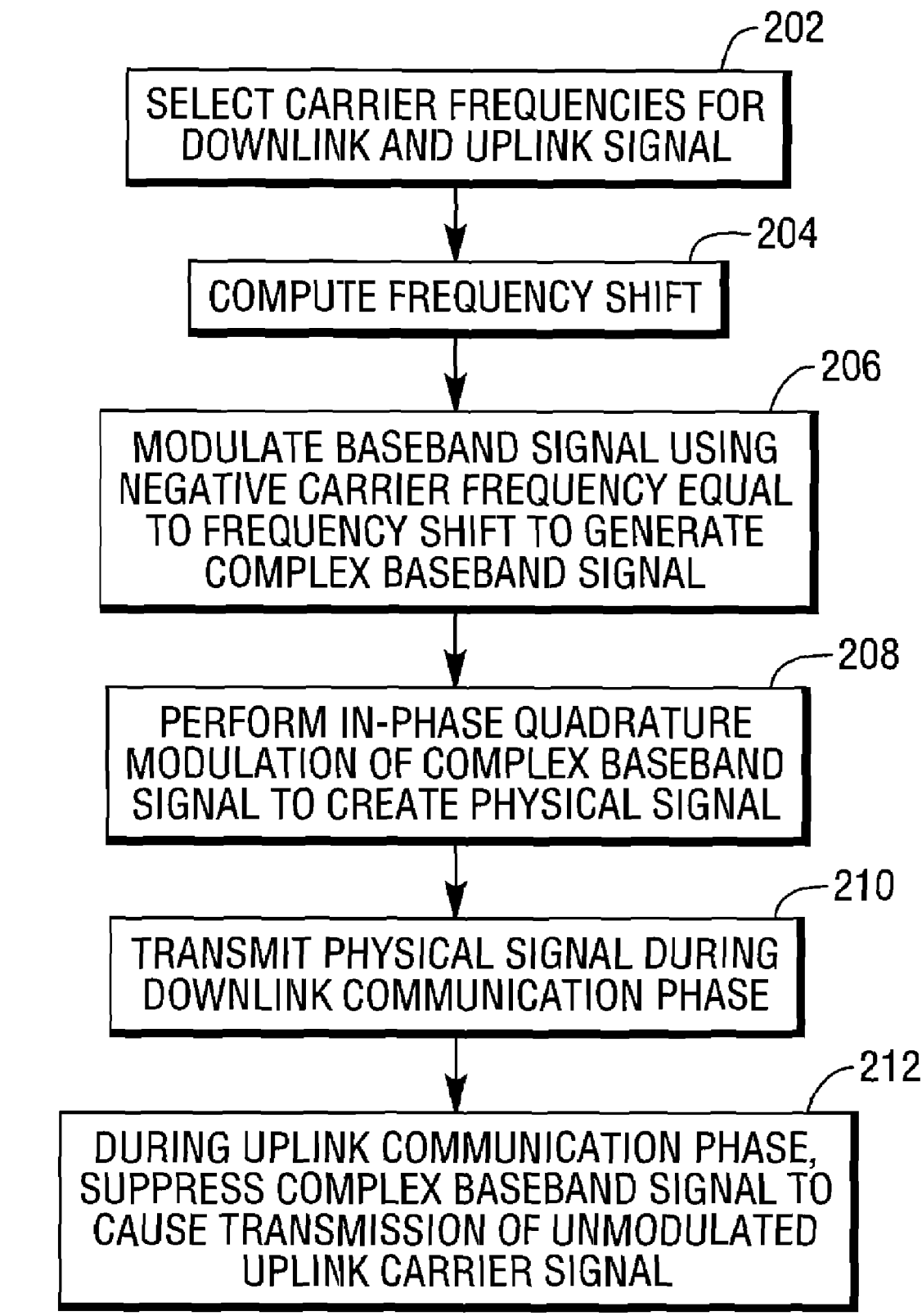
FIG. 2 illustrates a process of RFID communication according to an aspect of the present invention.

FIG. 2 illustrates a process 200 of communication signal generation by an RFID reader according to an aspect of the present invention. At step 202, carrier frequencies for a modulated downlink signal and an unmodulated uplink signal to be transmitted by an RFID receiver are selected. At step 204, a frequency shift representing the difference between the modulated uplink signal and the modulated downlink signal is computed. At step 206, the baseband signal is modulated using a negative carrier frequency equal to the frequency shift. The modulation is suitably accomplished by performing appropriate operations on a digital representation of the baseband signal, as described above, and may suitably be accomplished using a digital signal processor. This process produces a complex baseband signal multiplied by a negative frequency shift. At step 208, the complex baseband signal is converted to an actual physical downlink signal by performing in-phase/quadrature modulation on the complex baseband signal, using the downlink carrier frequency. This conversion is suitably accomplished by converting digital representations of in-phase and quadrature signals to analog form, using digital to analog converters for each of the in-phase and quadrature signals, and modulating the in-phase and quadrature signals using an in-phase/quadrature modulator having the in-phase and quadrature signals as inputs, as well as the downlink carrier signal. At step 210, the physical downlink signal is transmitted during a downlink communication phase. At step 212, during the uplink communication phase, the complex baseband signal is suppressed to cause transmission of the unmodulated uplink carrier signal. This result is accomplished by imposing a constant signal on the in-phase portion of the digital representation of the complex signal, and the quadrature portion of the digital representation of the complex signal is blocked, resulting in the transmission of the unmodulated uplink carrier signal.

Figure 3:
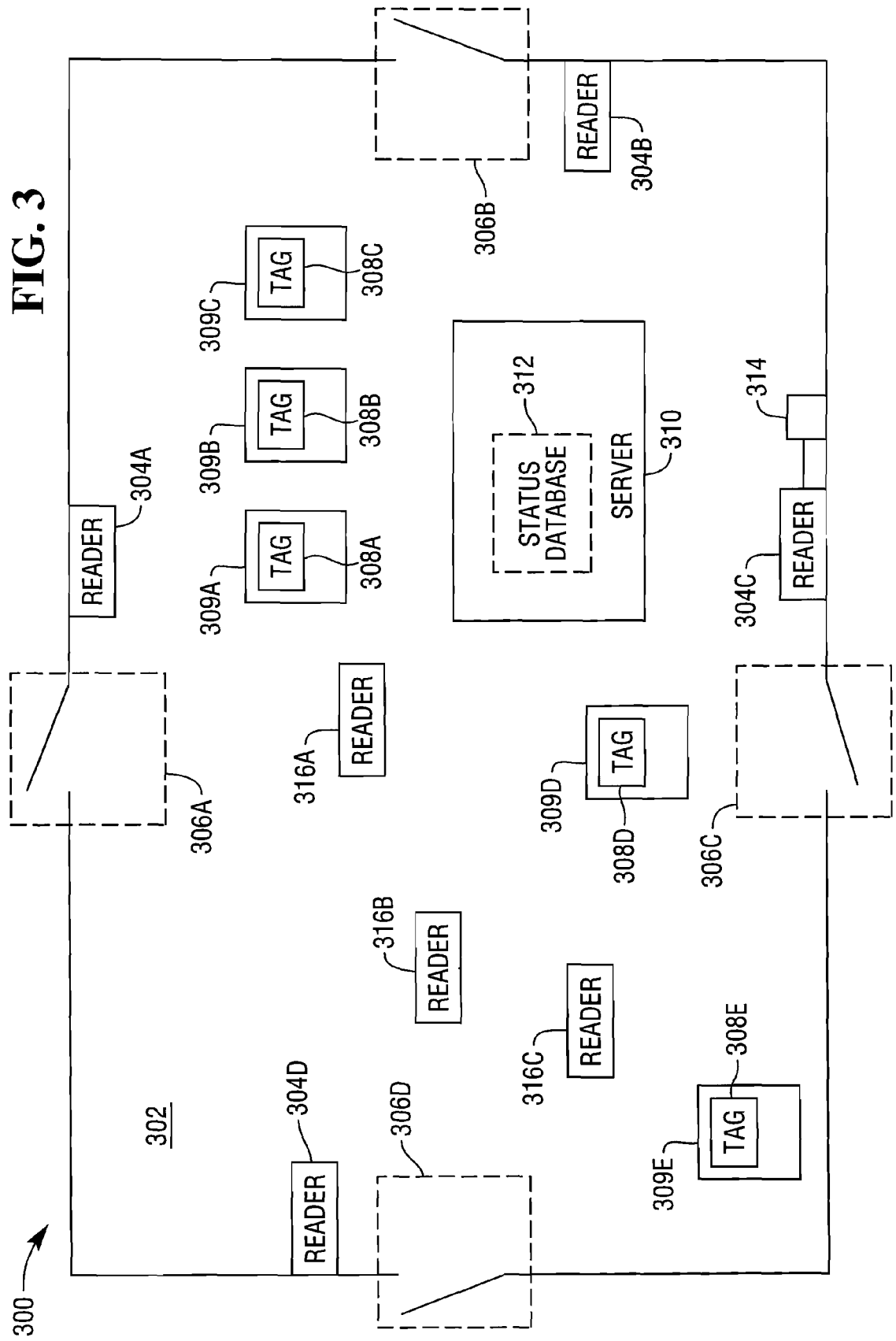
FIG. 3 illustrates an RFID communication system according to an aspect of the present invention.

FIG. 3 illustrates a radio frequency identification system 300 according to an aspect of the present invention. The system 300 may suitably deployed in a warehouse 302 and used for inventor control. A plurality of fixed RFID readers 304A-304D are placed adjacent to doors 306A-306D, respectively. Each of the readers 304A-304D may suitably be similar to the reader 100 of FIG. 1, discussed above, employing single sideband amplitude shift keying with a frequency shift accomplished by digital processing before creation of a physical signal for transmission. The readers 304A-304D transmit interrogations to sense the presence of RFID tags such as the tags 308A-308E. The tags 308A-308E may suitably be affixed to containers 309A-309E, respectively, with the containers 309A-309E containing goods to be tracked. When one of the readers 304A-304D, for example, the reader 304C, senses a tag within range, it examines a status database 310, suitably stored on a server 312, to identify goods associated with the tag and to determine whether removal of the goods is authorized. If removal is unauthorized, a reader issues an alert, suitably transmitting the alert to the server 312 for further action, sounding a local alarm such as the alarm 314, or both.

The system 300 may also include portable RFID readers such as the readers 316A-316C, which are preferably similar to the reader 100 of FIG. 1. The readers 316A-316C may be transported around the warehouse 300, for example, being carried by inventory control workers or affixed to forklifts used to transport goods. The readers 316A-316E may be used to locate goods to which RFID tags are affixed, to determine whether goods to which RFID tags are affixed are in their assigned locations, or to assist in the performance of any number of other tasks involving the identification of goods.

It can be seen that the system 300 involves a number or RFID readers in relatively close proximity to one another. In particular, one or more of the portable readers 316A-316C may move within close proximity to other readers at any time. Each of the readers 304A-304D and the readers 316A-316C suitably employs an individual channel separate from those used by other readers, in order to avoid conflicts and overlaps between reader communication. In order to accommodate the communication needs of the readers, the communication channel allocated to each of the readers 304A-304D and 316A-316C is relatively narrow, a system such as the system 300 may suitably employ single sideband amplitude shift keying in order to achieve communication using a relatively narrow frequency spectrum for transmissions by each RFID reader. In addition, by employing readers 304A-304D and 316A-316C similar to the reader 100 discussed above, the system 300 achieves a high performance because each of the readers achieves a relatively rapid frequency shift without instabilities and out of band emissions.

Figure 4:
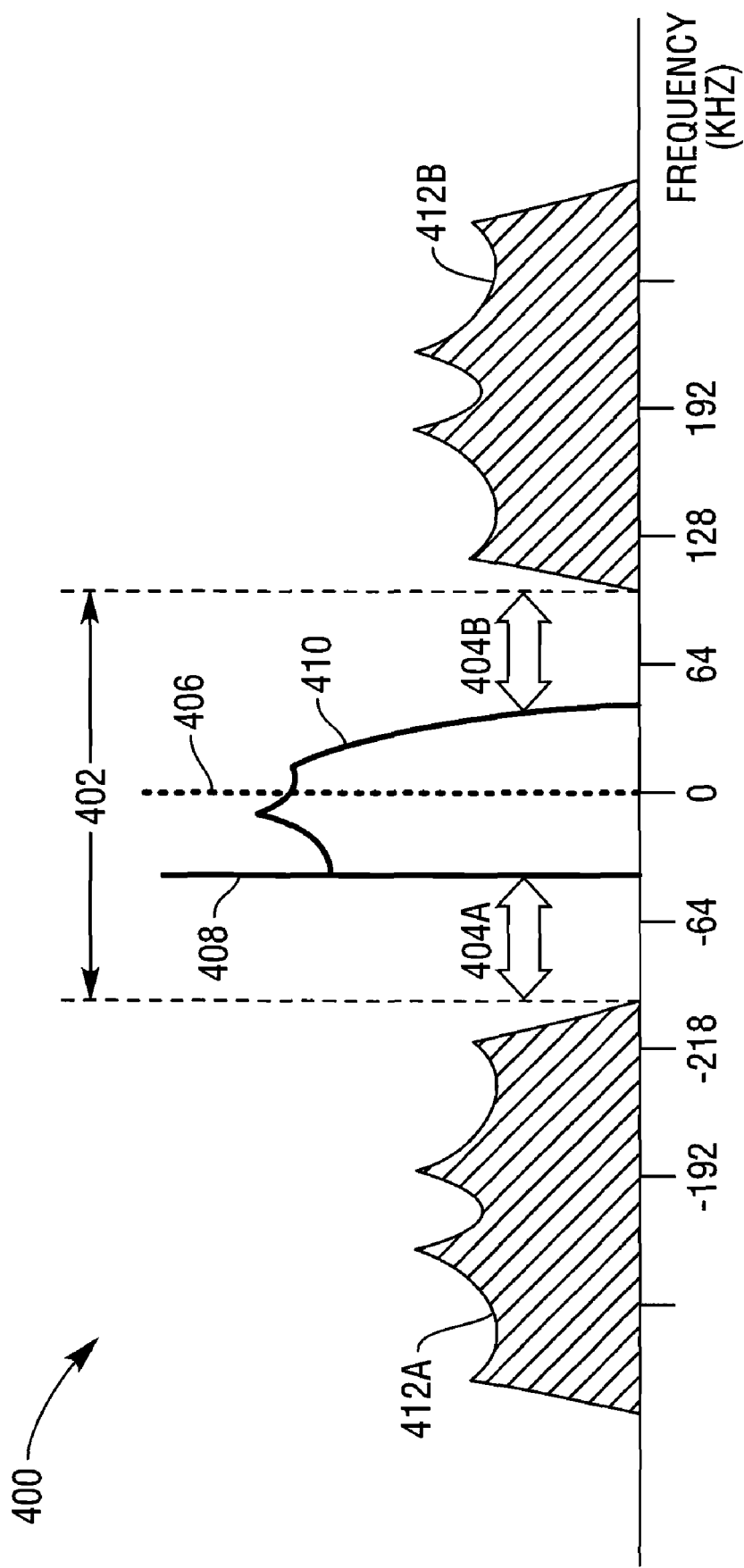
FIG. 4 illustrates an exemplary frequency spectrum and signals employed in single sideband amplitude shift keying modulated communication according to an aspect of the present invention.

FIG. 4 is a graph 400 illustrating an example of how the frequency spectrum may be allocated to RFID communication conducted using single sideband amplitude shift keying, as may be conducted according to an aspect of the present invention, and the frequency ranges occupied by various components of the communication. In FIG. 4, the frequency allocated to RFID reader uplink and downlink communication is a 200 kHz channel 402, which may be one of a number of channels used by different readers in a multiple reader environment. The channel includes guard bands 404A and 404B, and the transmissions generated by an RFID reader are restricted to the frequencies falling between those guard bands. An unmodulated uplink carrier signal 406 and a modulated downlink carrier signal 408, having a separate frequency from the uplink carrier signal 406, are shown. An exemplary waveform 410 of the single sideband signal produced by modulation of the carrier signal 408 is also shown, as are uplink responses 412A and 412B from an RFID tag. An RFID reader operating in the frequency spectrum shown must switch between the unmodulated signal 406 and the modulated signal 408 with every transition from uplink to downlink communications, and between the modulated signal 408 and the unmodulated uplink signal 406 with every transition from downlink to uplink communications. The present invention provides a fast carrier change without a need for a fast synthesizer and thereby minimizes or eliminates out of band transmissions and consequent interference with readers in adjacent channels.

While the present invention is disclosed in the context of aspects of presently preferred embodiments, it will be recognized that a wide variety of implementations may be employed by persons of ordinary skill in the art consistent with the above discussion and the claims which follow below.

I claim:

1. A radio frequency (RFID) reader for communicating with an RFID tag by transmitting a carrier signal to the RFID tag, comprising:
   a data processing unit for generating a data signal; and
   a communication unit for receiving the data signal and modulating the carrier signal using single sideband amplitude shift keying modulation to generate a modulated downlink signal at a downlink frequency during downlink communication between the reader and the tag, the communication unit being further operative to generate an unmodulated uplink signal at an uplink frequency differing from the downlink frequency by a frequency shift, the communication unit being further operative to implement the frequency shift between the uplink and downlink frequencies by digital processing of the data signal before generation of the carrier signal transmitted by the communication unit.

2. The reader of claim 1, wherein the data signal is a digital baseband signal and wherein the digital baseband signal is modulated using a negative carrier frequency representing the frequency shift between the uplink and downlink frequencies.

3. The reader of claim 2, wherein the modulation of the digital baseband signal creates a complex baseband signal multiplied by a negative frequency shift, and wherein the complex baseband signal is converted to a modulated signal transmitted by the communication unit by performing in-phase/quadrature modulation on the complex baseband signal using the uplink frequency of the carrier signal.

4. The reader of claim 3, wherein the modulation of the digital baseband signal is performed by a digital signal processor.

5. The reader of claim 4, wherein during uplink communication, wherein the digital signal processor generates in-phase and quadrature outputs representing in-phase and quadrature components of the complex baseband signal during downlink communication.

6. The reader of claim 5, wherein the digital signal processor, during uplink communications, generates as the in-phase output a constant signal and generates no signal or a zero signal as the quadrature output, thereby allowing the communication carrier signal generated during uplink communication to be the unmodulated uplink frequency signal supplied to the in-phase/quadrature modulator.

7. A method of generating a communication signal by a radio frequency identification (RFID) reader, comprising the steps of:
   generating a baseband data signal;
   modulating the baseband data signal using a carrier signal having a negative frequency equal to a frequency shift between an uplink frequency of the carrier signal and a downlink frequency of the communication signal to create a complex baseband signal multiplied by a negative frequency shift equal to the frequency difference between the downlink and uplink frequencies of the carrier signal; and performing in-phase/quadrature modulation of the complex carrier signal to create a physical communication signal for transmission by the reader.

8. The method of claim 7, wherein the baseband data signal is a digital signal and wherein the modulation of the baseband signal is performed by digital processing of the digital signal.

9. The method of claim 8, wherein the complex baseband signal includes an in-phase and a quadrature component.

10. The method of claim 9, during uplink communication, of replacing the in-phase component of the complex baseband signal by a constant value and replacing the quadrature component of the complex baseband signal by a zero signal or no signal, so that the carrier signal generated by the RFID reader will have the unmodulated uplink frequency.

* * * * *